(12) United States Patent
Stewart et al.

(10) Patent No.: US 7,104,123 B2
(45) Date of Patent: Sep. 12, 2006

(54) METHOD AND APPARATUS FOR DETECTING WHEEL MOTION IN A TIRE PRESSURE MONITORING SYSTEM

(75) Inventors: William David Stewart, Antrim (GB); Samuel Kane Strahan, Broughshane (GB); Alan Kenneth McCall, Templepatrick (GB)

(73) Assignee: Schrader Electronics, Limited, N. Ireland (GB)

( * ) Notice: Subject to any disclaimer, the term of this patent is extended or adjusted under 35 U.S.C. 154(b) by 0 days.

(21) Appl. No.: 10/936,313

(22) Filed: Sep. 8, 2004

(65) Prior Publication Data

US 2005/0081615 A1 Apr. 21, 2005

(30) Foreign Application Priority Data

Sep. 10, 2003 (GB) .................. 0321104.2

(51) Int. Cl.
*B06C 23/02* (2006.01)
(52) U.S. Cl. ..................... 73/146.5; 73/146.3
(58) Field of Classification Search ............. 73/146.5, 73/146.3
See application file for complete search history.

(56) References Cited

U.S. PATENT DOCUMENTS

| | | | | |
|---|---|---|---|---|
| 4,935,738 A * | 6/1990 | Pilato | ..................... | 340/870.24 |
| 4,947,151 A | 8/1990 | Rosenberger | ............... | 340/426 |
| 5,193,387 A | 3/1993 | Hodate | ..................... | 731/146.5 |
| 6,204,758 B1 | 3/2001 | Wacker et al. | ............... | 340/444 |
| 6,232,875 B1 | 5/2001 | DeZorzi | ..................... | 340/442 |
| 6,243,007 B1 * | 6/2001 | McLaughlin et al. | ........ | 340/447 |
| 6,278,363 B1 | 8/2001 | Bezek et al. | ................. | 340/442 |
| 6,485,169 B1 | 11/2002 | Ragner | ..................... | 362/500 |
| 6,580,364 B1 | 6/2003 | Munch et al. | ............... | 340/447 |
| 6,931,921 B1 * | 8/2005 | Shimura | ..................... | 73/146 |
| 2003/0009270 A1 | 1/2003 | Breed | ..................... | 701/29 |
| 2003/0233872 A1 | 12/2003 | Boulot | ..................... | 73/146 |
| 2003/0234041 A1 * | 12/2003 | Boulot | ..................... | 137/224 |
| 2004/0212487 A1 * | 10/2004 | Yagi et al. | ................... | 340/445 |
| 2005/0085987 A1 * | 4/2005 | Yokota et al. | ................ | 701/80 |
| 2005/0126275 A1 * | 6/2005 | Lin | ..................... | 73/146 |
| 2005/0156722 A1 * | 7/2005 | McCall et al. | .............. | 340/447 |
| 2005/0179530 A1 * | 8/2005 | Stewart et al. | .............. | 340/447 |
| 2005/0235744 A1 * | 10/2005 | Ogawa | ..................... | 73/146 |

FOREIGN PATENT DOCUMENTS

| | | |
|---|---|---|
| EP | 1 092 570 A1 | 4/2001 |
| EP | 1092570 A1 | 4/2001 |

(Continued)

OTHER PUBLICATIONS

European Search Report TS 71499 JP dated Mar. 2, 2004, 1 page.

(Continued)

*Primary Examiner*—Edward Lefkowitz
*Assistant Examiner*—George P. Bonanto
(74) *Attorney, Agent, or Firm*—Brinks Hofer Gilson & Lione

(57) ABSTRACT

An apparatus for detecting motion of a wheel comprising tyre. The apparatus comprises a pressure sensor for measuring the tyre pressure and generating a signal corresponding to the measured tyre pressure, and means for detecting a component of said signal that corresponds to, or is generated by, vibrations of the tyre. Upon detection of the signal component, the apparatus determines that the wheel is in motion. The detecting means may arranged to detect an audio signal component or signal components having a frequency in the range 200 Hz to 300 Hz.

15 Claims, 4 Drawing Sheets

FOREIGN PATENT DOCUMENTS

| | | |
|---|---|---|
| EP | 0793579 B1 | 7/2002 |
| EP | 1 338 446 A2 | 8/2003 |
| EP | 1338446 A2 | 8/2003 |
| EP | 1 457 388 A | 9/2004 |
| JP | 2000 355203 A | 12/2000 |
| JP | 2000355203 | 12/2000 |
| WO | WO 03/053747 A1 | 3/2003 |
| WO | WO 03/080371 A2 | 10/2003 |

OTHER PUBLICATIONS

European Search Report for European counterpart application No. EP 04 07 7459, 2 pages.

* cited by examiner

METHOD AND APPARATUS FOR DETECTING WHEEL MOTION IN A TIRE PRESSURE MONITORING SYSTEM

FIELD OF THE INVENTION

The present invention relates to detecting motion of a wheel, and more particularly of a wheeled vehicle. The invention relates particularly to the detection of wheel motion in a tyre pressure monitoring system.

BACKGROUND

Tyre pressure monitoring systems are well known. European Patent Application EP 0 793 579, which is hereby incorporated herein by way of reference, discloses an example of a known tyre pressure monitoring system. Typically, the system includes a pressure sensor which is incorporated into a vehicle's pneumatic tyre in order to monitor the air pressure therein. A control module, typically comprising a microprocessor, is provided for processing the output of the pressure sensor. The system also includes a transmitter for signalling the measured tyre pressure to a remote console usually provided in the vehicle's cabin. Normally, a battery is provided for supplying electrical power to the control module, the transmitter and any associated circuitry.

Conservation of battery power is an important consideration in a tyre pressure monitoring system. To this end, the system may adopt a normal operating mode when the vehicle is moving (or at least moving above a pre-determined threshold speed) and a conservation mode when the vehicle is stationary (or moving slower than a threshold speed). In the conservation mode, the system is less active than when in normal mode—for example, the pressure monitoring/transmitting cycle may occur one every few minutes rather then once every few seconds—and so battery usage is reduced.

Conventional tyre pressure monitoring systems usually include a mechanical roll switch (which typically includes a ball and spring mechanism), an accelerometer, or an equivalent mechanism, for detecting when the vehicle is in motion, or when the vehicle exceeds a threshold speed. Not only do such mechanisms add to the overall size of the system, but they are also considered to be relatively expensive and unreliable.

It would be desirable, therefore, to provide a relatively inexpensive, robust and space-saving alternative to conventional roll switches and equivalent mechanisms.

Several studies [1], [2] have indicated that a tyre when fitted to a wheel rim exhibits a natural resonance when excited. The presence of this resonance can be demonstrated when a fitted tyre is struck with a tyre iron or other object. The vibration or resonance of the tyre results in the generation of an audio signal or tone. The frequency of the tone is dependant on the structure and size of the tyre and also on the pressure (typically air pressure) inside the tyre. Research indicates that, for a normal passenger car, the general range of the resonant frequency is between 200 and 300 Hz.

SUMMARY OF THE INVENTION

In arriving at the present invention, it is recognised that, when a vehicle is travelling, its tyres are stimulated by interaction with the road surface (or other ground surface/terrain) thereby causing tyre vibration or resonance. The present invention uses a resultant signal (or absence thereof) to determine whether the vehicle is stationary or in transit.

A first aspect of the invention provides an apparatus for detecting motion of a wheel comprising tyre, the apparatus comprising a pressure sensor arranged to measure the tyre pressure and to generate a signal corresponding to the measured tyre pressure; and means for detecting a component of said signal that corresponds to, or is generated by, vibrations of the tyre, wherein, upon detection of said signal component, the apparatus determines that the wheel is in motion.

Typically, the tyre comprises a pneumatic tyre, although the invention may be used with other fluid-filled tyres.

The detecting means may arranged to detect an audio signal component. The detecting means may be arranged to detect signal components having a frequency in the range 200 Hz to 300 Hz.

In one embodiment, the pressure sensor generates an analogue signal, the apparatus comprising an analogue-to-digital converter (ADC) arranged to receive the analogue signal and to produce a corresponding digital signal, the detecting means being arranged to detect said signal component in said corresponding digital signal. For example, the detecting means may be arranged to detect said signal component in one or more of the least significant bits of the ADC signal.

In an alternative embodiment, the pressure sensor generates an analogue signal, the apparatus comprising a filter arranged to filter the sensor signal in order to extract said signal component; and a comparator arranged to compare the filtered sensor signal with a reference signal and to generate a comparator signal, the detecting means being arranged to detect said signal component from the characteristics of the comparator signal.

The detecting means may be arranged to detect pulses in said comparator signal. For example, the detecting means determines that said signal component is present by detecting a train of two or more pulses in said comparator signal.

The detecting means may comprise a control module arranged to detect said signal component, or a derivative thereof, and, upon detection of said signal component or derivative, to determine that the wheel is in motion. The control module may comprise a processor, such as a microprocessor or microcontroller, or may comprise a state machine device or a programmable logic controller (PLC) device.

A second aspect of the invention provides a tyre pressure monitoring device, for example a tyre pressure monitoring and transmitting wheel unit, comprising the apparatus of the first aspect of the invention.

A third aspect of the invention provides a method of detecting motion of a wheel comprising a tyre, the method comprising measuring the tyre pressure; generating a signal corresponding to, or generated by, the measured tyre pressure; detecting a signal component of said signal that corresponds to vibrations of the tyre; and, upon detection of said signal component, determining that the wheel is in motion.

In preferred embodiments, signal component detection involves detecting an audio signal component. Signal component detection may, for example, involve detecting a signal component having a frequency in the range 200 Hz to 300 Hz.

A fourth aspect of the invention provides a computer program product comprising computer program code for causing a computer to perform the method of the third aspect of the invention.

From another aspect, the invention provides a method of detecting motion of a wheeled vehicle having at least one wheel comprising a tyre, the method comprising detecting the presence of vibrations of the tyre caused by interaction of the wheel with a ground surface; and, upon detection of said vibrations, determining that the vehicle is in motion.

The invention has particular use in detecting motion of a wheel, or a wheeled vehicle, in a tyre pressure monitoring system comprising a pressure sensor arranged to detect the pressure of a tyre mounted on the wheel. In preferred embodiments, the output signal of the pressure sensor, or a derivative thereof, is examined for the presence of a signal component generated by, or corresponding to, vibrations of the tyre and, upon detection of said signal component, it is determined that the wheel, and therefore the vehicle, is in motion.

The output signal of the pressure sensor may be examined directly, but is advantageously amplified before examination. The apparatus may therefore include an amplifier for amplifying the sensor output signal. In some embodiments, the pressure sensor produces an analogue output signal which is examined after conversion to a digital form.

The invention is particularly suitable for use with cars, vans, lorries, trucks and motorcycles, but may equally be used with any vehicle having one or more wheels with one or more corresponding pneumatic, or other fluid-filled, tyres.

Further advantageous aspects of the invention will become apparent to those ordinarily skilled in the art by review of the following description of specific embodiments of the invention and with reference to the accompanying drawings.

BRIEF DESCRIPTION OF THE DRAWINGS

Embodiments of the invention will now be described by way of example and with reference to the accompanying drawings in which.

DETAILED DESCRIPTION OF THE DRAWINGS

Figure 1:
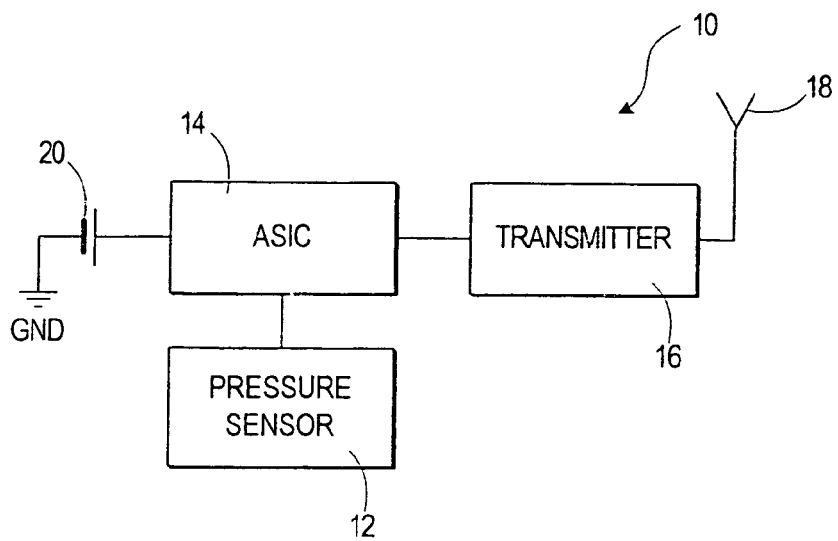
FIG. 1 is a block diagram of a sensor/transmitter unit of a tyre pressure monitoring system suitable for use with embodiments of the present invention.

Referring now to FIG. 1 of the drawings, there is shown, generally indicated as 10, a block diagram showing an example of a pressure sensing and transmitting unit of a tyre pressure monitoring system. The pressure sensing and transmitting device 10 is, during use, installed inside the pneumatic tyre of a vehicle's wheel (not shown) and may be referred to as the wheel unit 10.

The wheel unit 10 comprises a pressure sensor 12 for measuring gas pressure (typically air pressure) inside the tyre. The pressure sensor 12 may take any suitable conventional form, for example a piezo-resistive silicon sensor or a capacitive pressure sensor.

The operation of the pressure sensor 12 is controlled and interpreted by a control module 22 (FIG. 2) which, in FIG. 1, is included in an Application Specific Integrated Circuit (ASIC) 14, although it may be provided in any convenient form. Typically, the control module 22 periodically causes the pressure sensor 12 to measure air pressure and to return a corresponding signal. The control module 22 interprets the signal, or a derivative thereof, and may perform some processing operations such as temperature compensation.

Once the control module 22 has determined a value for the detected air pressure, it causes the value to be transmitted to a remote monitoring console (not shown) via transmitter 16 and antenna 18. The transmitter 16 may take any suitable form, usually an RF transmitter operating with, for example, a UHF carrier at, say, 300-450 MHz and the antenna 18 may be selected accordingly.

An electrical power source usually in the form of a battery 20 is provided to supply electrical power to the ASIC 14 which, in turn, supplies the pressure sensor 12 and transmitter 16.

The wheel unit 10 as described above is generally similar to known wheel units and, for reasons of clarity, only those components that are helpful to understanding the present invention are described herein. One notable difference between the wheel unit 10 and conventional wheel units (for example the unit disclosed in EP 0793 579) is the absence of a mechanical roll switch, or equivalent mechanism, for detecting when the vehicle is moving, or moving above a threshold speed.

Figure 2:
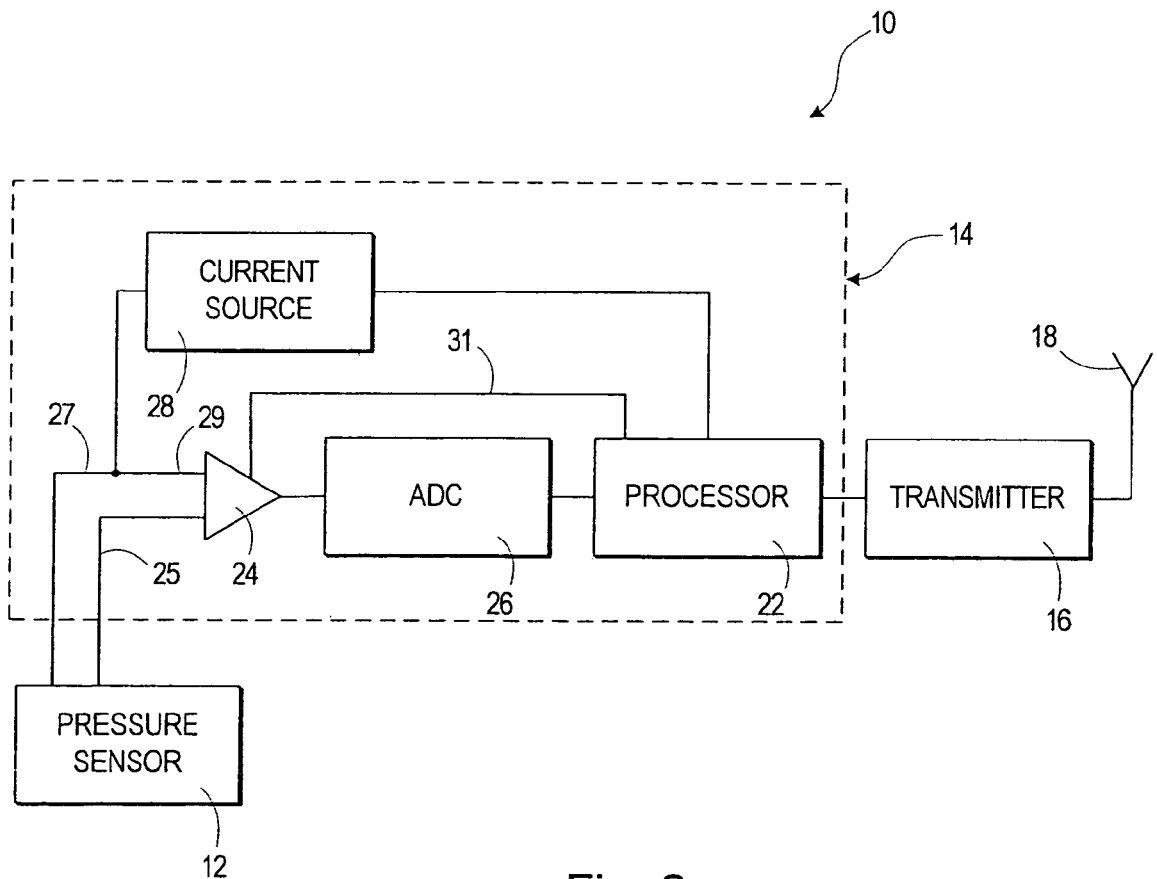
FIG. 2 is a block diagram showing aspects of the sensor/transmitter unit of FIG. 1 in more detail.

FIG. 2 shows, by way of example only, the ASIC 14 in more detail. The output of the pressure sensor 12, which in the present embodiment comprises an analogue signal, is advantageously supplied to an amplifier 24 via signal line 25. The output of the amplifier 24 is supplied to an analogue-to-digital converter (ADC) 26 which converts the amplified analogue sensor output into a corresponding digital signal.

In the preferred embodiment, the control module 22 comprises a processor typically in the form of a microprocessor, microcontroller, or equivalent device (but may alternatively comprise a state machine device, programmable logic device (PLD) or equivalent device) which receives the output of the ADC 26. The processor 22 processes the output of the ADC 26 to determine the detected air pressure. Typical processing operations which may be performed by the processor 22 on the ADC output are well known to those skilled in the art and need not be described herein.

In the embodiment of FIG. 2, it is assumed, by way of example only, that the pressure sensor 12 is of the type that requires a constant current supply. Accordingly, the wheel unit 10 includes a current source 28 arranged to supply current to the pressure sensor 12 via supply line 27. Conveniently, the current source 28 also supplies power to the amplifier 24 via supply line 29. Preferably, the current source 28 is controlled by the processor 22 so that the pressure sensor 12 and amplifier 24 may be turned on and off by the processor 22 as required. Optionally, the processor 22 may be arranged to control the gain of the amplifier 24 as is indicated by control line 31, although typically the gain is fixed to a pre-determined level.

It will be understood that the processor 22 is the heart of the control module and that the associated circuitry 24, 26, 28 which, in the embodiment of FIG. 2 is included in the ASIC 14, may alternatively be provided outside of the ASIC and do not necessarily comprise part of the control module.

In arriving at the present invention, it is recognised that, when a wheel (not shown) is in rolling contact with a ground surface, the interaction of the wheel's tyre (not shown) and the ground surface (not shown) generates vibrations, or noise, which cause relatively small fluctuations in the air pressure within the tyre. Hence, the vibration or resonance of the tyre generates a signal which, for normal road surfaces and normal vehicle tyres, is usually present in the range 200 Hz to 300 Hz, commonly in the range 220 Hz to 290 Hz. In such cases, the signal may therefore be said to comprise an audio signal or resonance. The pressure sensor 12 detects the audio signal when it measures the air pressure in the tyre. As a result, the output signal of the pressure sensor includes one or more signal components representing the audio signal. By way of example only, for normal vehicle tyres and road surfaces, a pressure sensor having an output sensitivity in the range 50 µV to 200 µV corresponding to a detected pressure in the region of 30 mpsi would be suitable for detecting the audio signal component.

It will be understood that the invention is not limited to the detection of signal components in the range 200 Hz to 300 Hz, or to the detection of audio signal components. More generally, the output of the pressure sensor may be examined for the presence (or absence) of one or more signal components which represent tyre pressure fluctuations caused by tyre vibrations or road noise resulting from rolling engagement between the tyre and the ground surface. Such signal components may be referred to as noise components.

In the following embodiments of one aspect of the invention, the wheel unit 10 is arranged to detect noise component (s) at the output of the pressure sensor and, upon detection of the noise component(s), to determine that the wheel in which it is installed is rolling, i.e. that the associated vehicle is moving. For illustrative purposes, it is assumed that the noise components comprise an audio signal component in the frequency range 200 Hz to 300 Hz.

There are a number of ways in which this may be achieved. For example, in one embodiment, the processor 22 is arranged to examine the output signal generated by the pressure sensor 12 at a sufficiently high resolution to detect the presence or otherwise of the signal component corresponding to the audio signal. With reference to FIG. 2, this may be achieved by setting the gain of amplifier 24 to an appropriate level, or by using an ADC 26 with a sufficiently high resolution, or a combination of both. For example, suppose that the ADC of a conventional wheel unit provides an output comprising 8 bits. By using a higher resolution ADC with, say, a 12 bit output, the 8 most significant bits may be used to provide the normal pressure measurement while the remaining 4 bits represent the audio signal component. In general, one or more least significant bits of the output of the ADC 26 may be examined by the processor 22 to determine whether or not an audio signal component is present. In this embodiment, the processor 22, the ADC 26 and, if required, the amplifier 24, may collectively be referred to as means for detecting the signal component that corresponds to vibrations of the tyre. It will be understood that the detecting means may take other forms. For example, as suggested above, the ADC 26 and/or the amplifier 24 may not be required in which case the detecting means comprises the processor 22.

Figure 3:
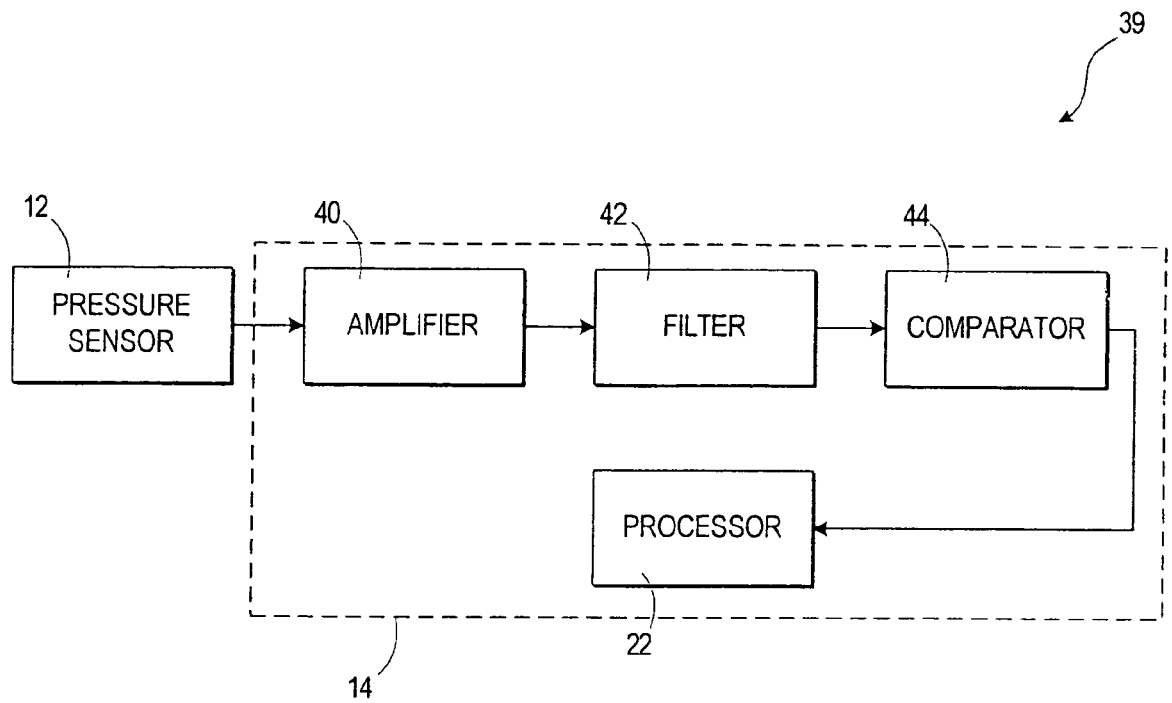
FIG. 3 is a block diagram of an embodiment of an apparatus for detecting wheel motion in accordance with one aspect of the present invention.

An alternative embodiment is illustrated in FIG. 3 which shows a pressure sensing apparatus or device, generally indicated at 39, embodying one aspect of the present invention. The apparatus 39 includes the pressure sensor 12, the output signal of which is provided to an amplifier 40 (amplifier 24 (FIG. 2) may conveniently serve as amplifier 40). The amplified signal is provided to a filter 42 arranged to extract, or pass, the audio component from the amplified signal. In the present embodiment, filter 42 may comprise any suitable analogue filter, for example a band pass filter configured to pass signals in the 200 Hz to 300 Hz frequency band. In this embodiment, the processor 22, the comparator 44, the filter 42 and, if required, the amplifier 40 may collectively be referred to as means for detecting the signal component that corresponds to vibrations of the tyre.

Figure 4A:
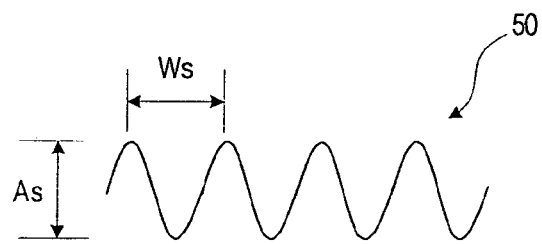
FIG. 4A is a graphical representation of an audio signal component of an output signal generated by a pressure sensor.

FIG. 4A shows a simplistic representation of the audio signal component 50 present at the output of the pressure sensor 12 when the vehicle is moving. The signal component 50 is shown in the form of a generally sinusoidal signal having a frequency of $1/W_s$, where $W_s$ is the wavelength of signal 50, and an amplitude of $A_s$. For the purposes of example only, the frequency ($1/W_s$) is assumed to be approximately 250 Hz and the amplitude is assumed to be approximately 100 µV. The filtered signal produced by the filter 42 comprises an amplified version of the signal component 50.

Figure 4B:
FIG. 4B is a graphical representation of the output of a comparator supplied with the audio signal component of FIG. 4A.

The amplified version of signal component 50 is provided to a comparator 44 which generates an output signal by comparing the amplified signal component 50 to a reference level or signal (not shown). The comparator output signal is provided to the processor 22 for analysis. When the vehicle is moving, the comparator output signal comprises a pulse train 52 (FIG. 4B). In the present example, the reference signal comprises a constant zero volt reference level, or a representation thereof. Hence, when the filtered signal exceeds the reference level, a pulse is generated by the comparator 44. In FIG. 4B, the pulse train 52 comprises pulses of amplitude $A_o$ and frequency $1/W_o$, where $W_o$ is the effective wavelength of the pulse signal. In the present example, the amplitude $A_o$ is approximately 3 volts and the frequency $1/W_o$ is approximately 250 Hz.

When the vehicle is stationary, the output of the pressure sensor 12 does not include an audio signal component 50 and so there is no detectable filtered signal produced by the filter 42 (which in the present example corresponds to a filtered signal of zero volts). Accordingly, the signal supplied to the comparator 44 from filter 42 comprises a constant zero volts and does not, therefore, exceed the comparator reference level. Hence, in the present example, when the vehicle is stationary, the comparator 44 produces a constant output of zero volts. It will be appreciated that a reference level, or 'zero' level, other than zero volts may be used in alternative embodiments.

In the preferred embodiment, the amplifier 40, the filter 42 and the comparator 44 are each included in the ASIC 14, or other integrated circuit, as indicated by the broken line in FIG. 3.

An example of the operation of the processor 22 (in the context of the embodiment of FIG. 3) is now described with reference to FIGS. 5 and 6. The processor 22 may comprise a microprocessor, microcontroller, or similar device, arranged to run computer program code which may conveniently be stored in internal or external program memory (not shown). In such cases, the processor 22 serves as the control module when running the relevant computer program code. The computer program code causes the processor 22 to implement one or more program routines which may conveniently be illustrated in the form of flowcharts. Alternatively, the processor 22 may comprise a state machine device or programmable logic device (PLD) arranged to perform a plurality of processing functions.

These processing functions may also conveniently be illustrated in the form of flowcharts. In FIGS. 5 and 6, only those routines that are relevant to the present invention are described and illustrated herein. In the following description, numerals in parentheses refer to respective operations of the flowcharts shown in FIGS. 5 and 6.

Figure 5:
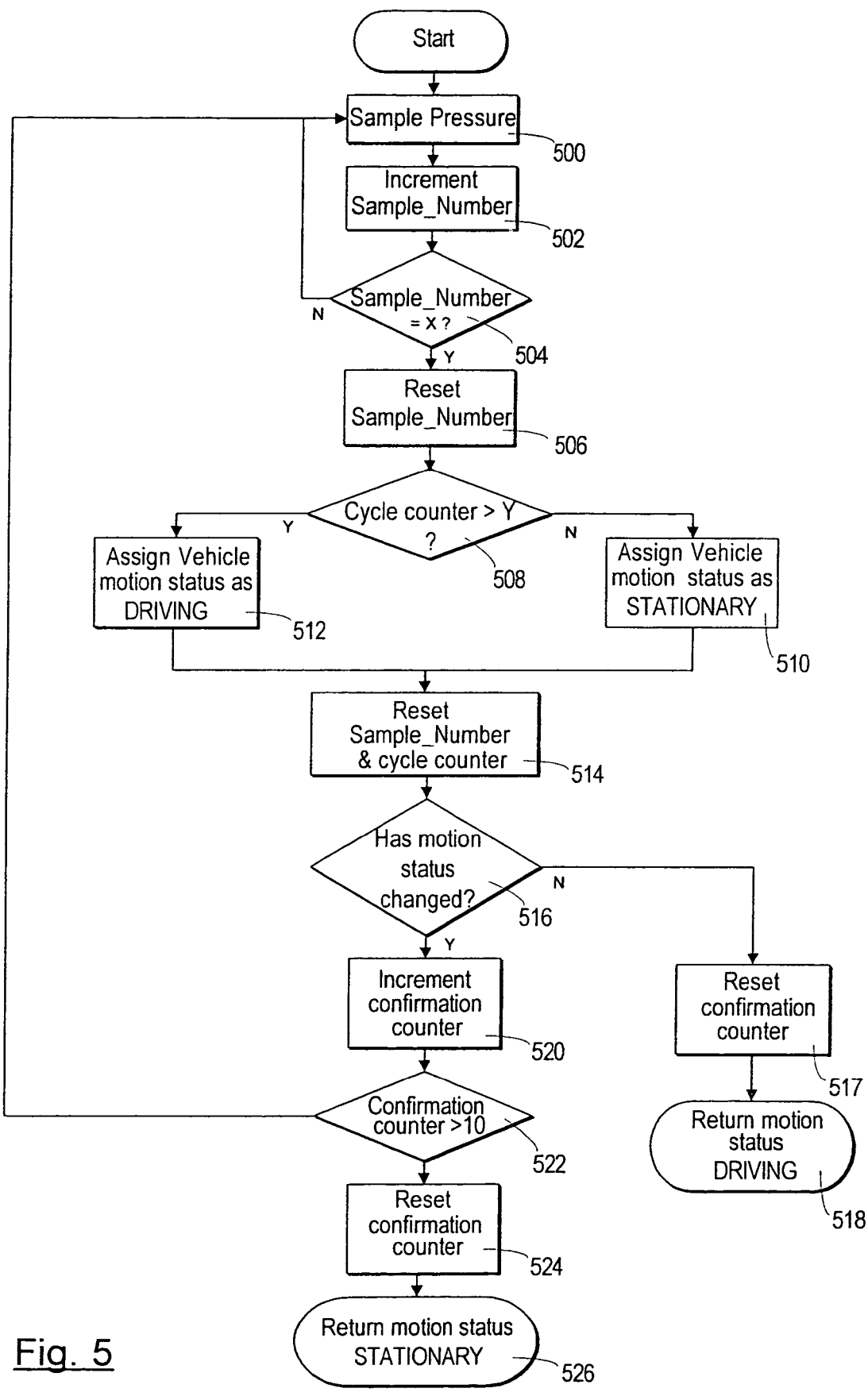
FIG. 5 is a flowchart illustrating processing operations which are performed in accordance with a preferred embodiment of the invention.

Starting with the flowchart of FIG. 5, the processor 22 causes the pressure sensor 12 to measure, or sample, the air pressure in the tyre (500). As a result, the processor 22 receives an input signal comprising the comparator 44 output signal, as described above. The processor 22 analyses the received input, preferably in real-time, to determine whether or not it comprises a valid pulse train 52. Part of this analysis is conveniently illustrated as a separate routine in the flowchart of FIG. 6.

Figure 6:
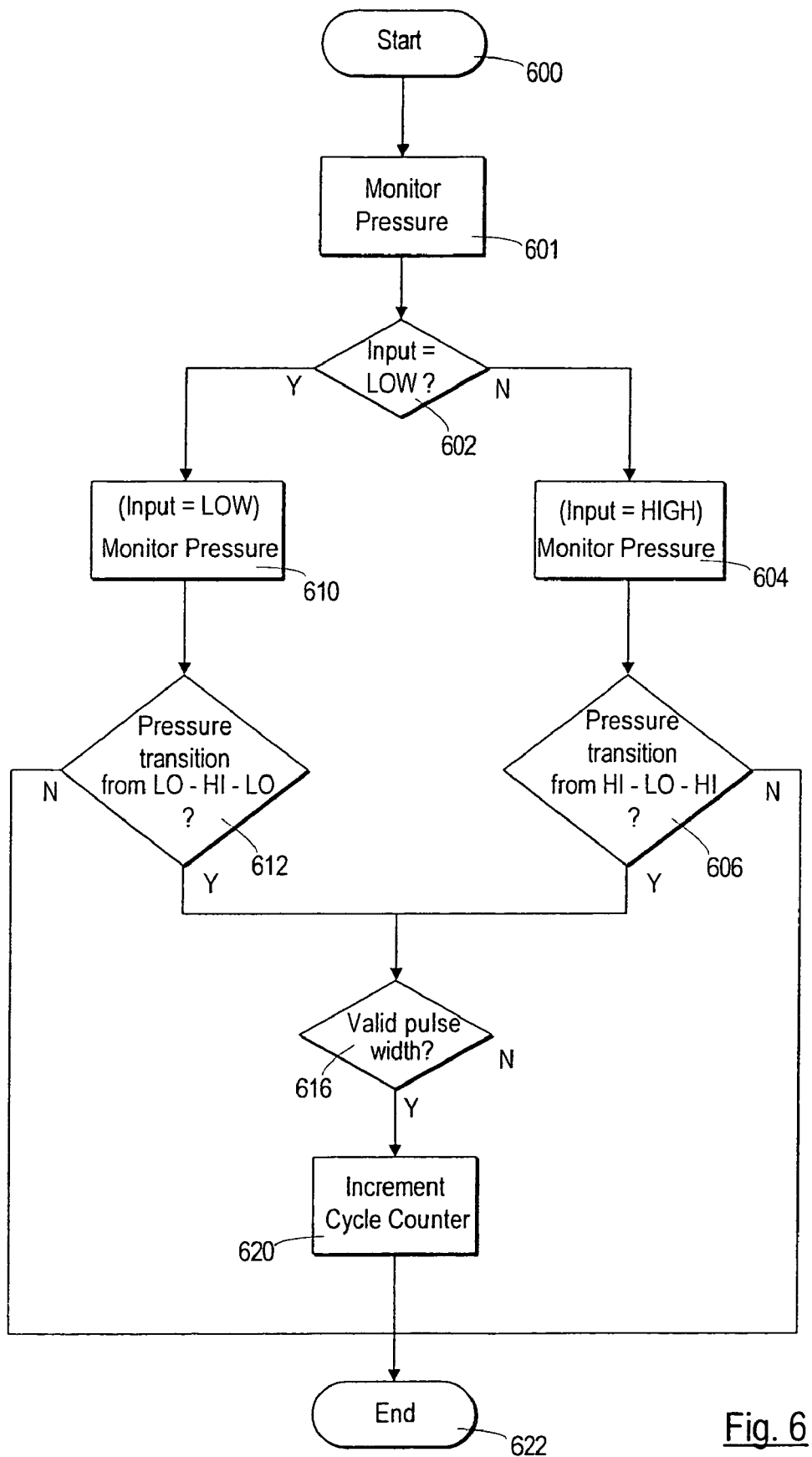
FIG. 6 is a flowchart illustrating further processing operations which are performed in accordance with a preferred embodiment of the invention.

In FIG. 6, following the start (600) of the routine, the processor 22 examines (601) the received input signal (which comprises the output of the pressure sensor 12 or a derivative thereof) and determines whether, at that instant, the input is HIGH or LOW (602). In the present example, logic HIGH may be represented by an input level of, say, 3 volts, while logic LOW is represented by an input level of zero volts.

If the input is LOW, the processor 22 monitors (610) the input for a pre-determined period (which is determined by the frequency 1/Wo and, in the present example, is just over 2 mS) to determine if the input exhibits pulse characteristics. In the present example, this is achieved by checking if the input subsequently goes HIGH and then LOW (612). If such a transition of the input signal does not occur, then the processor 22 determines that there has been no change of state in the input and that, accordingly, a valid pulse has not been detected. As a result, the routine of FIG. 6 ends (622).

If, at operation 612, it is determined that the input does exhibit the requisite pulse characteristics, then the processor 22 preferably takes steps to verify whether or not the detected change in state should be regarded as a valid pulse (616). Conveniently, this may be achieved by monitoring the input to determine if the detected change in state is maintained for a pre-determined period, for example about 1 mS. If, at operation 616, the change in state is not maintained for the pre-determined period, the processor 22 determines that a valid pulse has not been detected and the routine ends (622). If, at operation 616, the change of state is maintained for the pre-determined period, then the processor 22 determines that a valid pulse has been detected and updates (e.g. increments) a pulse or cycle counter (not illustrated) which the processor 22 maintains, conveniently in internal or external memory, to count the number of detected valid pulses. Once the cycle counter has been incremented (620), the routine of FIG. 5 ends (622).

If, after operation 602, the input is HIGH, the processor 22 monitors (604) the input for a pre-determined period (which is determined by the frequency 1/Wo and, in the present example, is just over 2 mS) to determine if the input subsequently exhibits pulse characteristics. In the present example, this is achieved by checking if the input subsequently goes LOW and then HIGH (606). If not, then the processor 22 determines that there has been no change of state in the input and that, accordingly, a valid pulse has not been detected. As a result, the routine of FIG. 6 ends (622).

If, at operation 606, the input does exhibit pulse characteristics, then this is an indication that a pulse has been detected. As before, it is preferred that the processor 22 takes steps to verify the detected change of state before concluding that a valid pulse has been detected and so control is passed to operation 616.

When the routine of FIG. 6 ends (622), the processing sequence returns to the routine of FIG. 5.

It is preferred that the processor 22 performs multiple examinations of the input signal received from the comparator 44 before deciding whether or not a valid pulse train is detected. Hence, the routine illustrated in FIG. 6 is performed several times so that the processor 22 may detect more than one pulse in succession, i.e. a pulse train. In the present example, the processor 22 maintains an internal counter (called Sample_Number in FIG. 5) which counts the number of times the input signal is examined. Only when Sample_Number reaches a threshold value does the processor 22 decide whether or not a pulse train has been detected. This is illustrated by way of example in FIG. 5.

After the processor 22 has performed the operations of FIG. 6 and control is returned to the routine of FIG. 5, the processor 22 adjusts, e.g. increments, the counter Sample_Number (502) and then determines whether or not the new value of Sample_Number matches or exceeds a threshold value X (504). The threshold value may take any suitable value, for example ten. If the threshold value is not exceeded, then the processor 22 returns to operation 500 whereupon a newly received input signal from comparator 44 is examined in accordance with FIG. 6.

Once the value of Sample_Number matches or exceeds the threshold value X, the processor 22 resets Sample_Number (506) and then determines whether or not a valid pulse train has been detected (508). In the present example, this is achieved by examining the value of the pulse, or cycle counter. If the value of the cycle counter matches or exceeds a threshold value Y, i.e. if a pre-determined number of valid pulses have been detected, the processor 22 determines that a valid pulse train has been detected and that, accordingly, the vehicle is moving (512). If the value of the cycle counter does not match or exceed the threshold value, i.e. if the pre-determined number of valid pulses have not been detected, the processor 22 determines that a valid pulse train has not been detected and that, accordingly, the vehicle is stationary (510). The threshold value for the cycle counter may take any suitable value, for example five.

After the cycle counter has been examined, it is reset by the processor 22 (514).

As a precautionary measure, it is preferred that the processor 22 verifies the decision it made at operation 508. Hence, the processor 22 compares the current decision (i.e. whether or not a valid pulse train is currently detected) made at operation 508 to the decision that it made the previous time operation 508 was performed (516). If the current and previous decisions are the same, then the current decision is verified and the processor 22 reports (518) the current decision to the appropriate component of the control module 14 (typically another routine running on the processor 22). If the current decision is not the same as the previous decision, then operations 500 through 516 are repeated so that the new decision may be confirmed or otherwise. This is preferably performed under the control of a confirmation counter which is updated (e.g. incremented) each time the processor 22 determines at 516 that the current decision on vehicle motion status has changed (520). At operation 522, the processor checks if the value of the confirmation counter exceeds a threshold value, for example 10. If not, then operations 500 to 516 are repeated. If the confirmation counter reaches its threshold value, then the processor 22 resets the confirmation counter (524) and returns a decision that the vehicle is stationary (526). The confirmation counter is also reset (517) before operation 518. Use of the confirmation counter is preferred as it limits the number of times processor 22 performs steps 500 to 516 in the event that two consistent successive results are not detected.

The decision returned by the processor 22 after execution of the routines illustrated in FIGS. 5 and 6 informs the control module 14 whether the vehicle is stationary or moving.

The method and apparatus described herein which embody the invention provide a reliable and relatively inexpensive solution to the problem of detecting vehicle motion, not least because the need for a mechanical roll switch or equivalent mechanism is removed. In the simplest embodiment, the wheel unit 10 may require no additional physical components, only the addition of one or more processing routines for the processor 22. Even in the embodiment of FIG. 3, the additional components used, namely the filter 42 and comparator 44, are reliable, inexpensive and do not require significant additional space (especially when incorporated into the ASIC).

The invention is not limited to the embodiments described herein which may be modified or varied without departing from the scope of the invention.

References

[1] Zegelaar, P. W. A., "Modal analysis of tire in-plane vibrations", SAE paper 971101, SAE International congress and Exposition, Detroit, USA, Feb. 24–27, 1997.

[2] Zegelaar, P. W. A., Gong, S., Pacejka, H. B., "Tyre models for the study of in-plane dynamics", 13th IAVSD Symposium, Chengdu, P. R. of China, Aug. 23–27, 1993, Vehicle System Dynamics, Vol. 23 supplement, 1994, pp. 578–590.

The invention claimed is:

1. An apparatus for detecting motion of a wheel comprising a tire containing, in use, fluid at a pressure, the apparatus comprising a pressure sensor arranged to measure the pressure of said fluid and to generate a signal indicating the measured fluid pressure; and means for detecting a component of said signal that corresponds to variations in the pressure of said fluid caused by vibrations of the tire which result from rolling contact between the tire and a ground surface, wherein, upon detection of said component of said signal, the apparatus determines that the wheel is in motion.

2. An apparatus as claimed on claim 1, wherein said detecting means is arranged to detect an audio signal component.

3. An apparatus as claimed in claim 1, wherein said signal component has a frequency in the range of 200 Hz to 300 Hz.

4. An apparatus as claimed in claim 1, wherein the pressure sensor generates an analogue signal, the apparatus comprising an analogue-to-digital converter (ADC) arranged to receive the analogue signal and to produce a corresponding digital signal, the detecting means being arranged to detect said signal component in said corresponding digital signal.

5. An apparatus as claimed in claim 4, wherein said corresponding signal comprises a plurality of bits in order of significance from a least significant bit to a most significant bit, the detecting means is arranged to detect said signal component at least in said least significant bits of said corresponding digital signal.

6. An apparatus as claimed in claim 1, in which the pressure sensor generates an analogue signal, the apparatus comprising a filter arranged to filter said signal corresponding to the measured fluid pressure in order to extract said signal component; and a comparator arranged to compare said signal corresponding to the measured fluid pressure, when filtered by said filter, with a reference signal and to generate a comparator signal, the detecting means being arranged to detect said signal component from the characteristics of the comparator signal.

7. An apparatus as claimed in claim 6, in which the detecting means is arranged to detect pulses in said comparator signal.

8. An apparatus as claimed in claim 7, wherein the detecting means determines that said signal component is present by detecting a train of two or more pulses in said comparator signal.

9. An apparatus as claimed in claim 1, wherein said component of said signal corresponds to variations in the pressure of said fluid caused by a resonance of the fluid in the tire which results from rolling contact between the tire and a ground surface.

10. A device as claimed in claim 9, further including a control module which causes said device to operate in a normal mode when said apparatus for detecting motion determines that the wheel is in motion, and which otherwise causes said device to operate in a conservation mode.

11. A method of detecting motion of a wheel comprising a tire containing, in use, fluid at a pressure, the method comprising measuring the pressure of said fluid; generating a signal indicating the measured fluid pressure; detecting a signal component of said signal that corresponds to variations in the pressure of said fluid caused by vibrations of the tire which result from rolling contact between the tire and a ground surface; and, upon detection of said signal component, determining that the wheel is in motion.

12. A method as claimed in claim 11, wherein said signal component detection involves detecting an audio signal component.

13. A method as claimed in claim 11, wherein said signal component detection involves detecting a signal component having a frequency in the range of 200 Hz to 300 Hz.

14. A device for monitoring fluid pressure within a tire of a wheel, the tire containing, in use, fluid at a pressure, the device comprising a pressure sensor arranged to measure the pressure of the fluid and to generate a signal indicating the measured fluid pressure; and an apparatus for detecting motion of the wheel, the apparatus including means for detecting a component of said signal that corresponds variations in the pressure of said fluid caused by to vibrations of the tire which result from rolling contact between the tire and a ground surface, wherein, upon detection of said component of said signal, the apparatus determines that the wheel is in motion.

15. A computer program product stored on a computer readable medium for detecting motion of a wheel comprising a tire containing, in use, fluid at a pressure, the computer program product comprising:
  a first code for measuring the tire pressure of said fluid;
  a second code for generating a signal indicating the measured fluid pressure;
  a third code for detecting a signal component of said signal that corresponds to variations in the pressure of said fluid caused by vibrations of the tire which result from rolling contact between the tire and a ground surface; and
  a fourth code for determining that the wheel is in motion upon detection of said signal component.

* * * * *